May 27, 1924.
L. TILTON ET AL
1,495,461
REMEDY FOR THE TREATMENT OF DISEASES
Filed Oct. 13, 1921
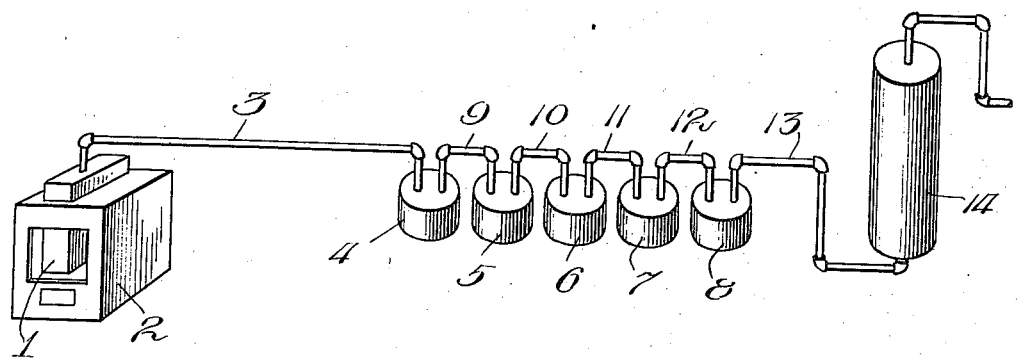
Inventors:
Lester Tilton
and Robert C. Timms
by Dunning & Dunning Attys Patented May 27, 1924.

1,495,461

UNITED STATES PATENT OFFICE.

LESTER TILTON, OF CLINTON, IOWA, AND ROBERT G. TIMMS, OF CHICAGO, ILLINOIS.

REMEDY FOR THE TREATMENT OF DISEASES.

Application filed October 13, 1921. Serial No. 507,463.

*To all whom it may concern:*

Be it known that we, LESTER TILTON, of Clinton, in the county of Clinton and State of Iowa, and ROBERT G. TIMMS, of Chicago, Cook County, Illinois, both citizens of the United States, have invented certain new and useful Improvements in Remedies for the Treatment of Diseases, of which the following is a specification.

This invention has to do with a certain new and useful remedy for the treatment of diseases, and also has to do with the process and apparatus whereby such remedy is produced from the raw materials. Briefly stated, the remedy to which this invention relates consists of a pyroligneous compound manufactured from certain classes of peat by the proper application of heat.

The compound herein disclosed is of great therapeutic value in that it has proven very efficacious for the treatment of definite anatomical and physiological conditions such as epithelicma (cancer), rodent ulcers, and other vicious tissue destroying conditions heretofore considered in most cases incurable by the present resources and limits of medicine.

The peat used to obtain this pyroligneous compound must show a quantitative and fixed standard analysis of the elements and combinations of elements as stated elsewhere in this specification after being subjected to a temperature of substantially 1200° C. in a closed retort, for a period of four to six hours, the distillates being recovered therefrom by air cooled apparatus of suitable form.

All peats when subjected to destructive distillation in a retort for the formation of pyroligneous compounds are composed of certain definite and known decomposed vegetable material. The volatile constituents derived from the distillation of the peat depend not only on the characteristics of the distillation process itself, such as the temperature of distillation, and time during which the material is subjected to such temperature, but also depend very largely on the nature and composition of the material subjected to such treatment. Wide experience has shown that a pyroligneous compound possessing the characteristics of that herein referred to can be successfully produced by the proper treatment of a certain class of peats found in particular localities. In order that the composition of peats which may be successfully treated for the production of the pyroligneous compound herein referred to may be better understood, we will first give certain examples of such peats and will also disclose the locations where certain peat beds are found possessing the desired characteristics.

There is located in the vicinity of Morrison, Whiteside County, Illinois, a peat bed of the Mississippi River Valley which, according to the reports of the United States Geological Survey shows substantially the following characteristics:

*Standard analysis.*

Raw peat: Three (3) samples by Department of Interior, United States Geological Survey, show the following composition:—

Name of marsh: No. 307—Cattail Slough.

Character of peat: Brown, spongy, fibrous, near top, better decomposed near bottom.

Composition of peat: Free from silt, indicated sedges, bullrushes, reeds and roots, also some moss and grass.

Surface vegetation: Marsh grass predominating; sedges, many grouped bullrushes, reeds, cattails, marsh daisies.

308. Name of marsh: Cattail Slough.

Character of peat: Brown, fibrous to woody near bottom.

Composition of peat: Free from silt; spongy sedges, bullrushes; bullrushes predominating.

Surface vegetation: Bullrushes, cattails, some bog moss, and grass. Very few sedges.

309. Name of marsh: Cattail Slough.

Character of peat: Brown, fibrous to black, less fibrous, better decomposed.

Composition of peat: Free from silt; sedge remains, also moss, bullrushes and cattails.

Surface vegetation: Grasses, cattails, bullrushes, very few sedges.

According to the reports of the United States Bureau of Mines these samples of peat disclose the following analyses:

*Bureau of Mines report on Cattail Slough. Coal-analysis report.*

| Sample peat (air-dry loss). | | Coal (as received). | Coal (moisture free). |
|---|---|---|---|
| #307. | | | |
| Proximate analysis. | Moisture | 15.73 | |
| | Volatile matter | 55.32 | 65.65 |
| | Fixed carbon | 5.37 | 6.37 |
| | Ash | 23.58 | 27.98 |
| | | 100.00 | 100.00 |
| Ultimate analysis. | Hydrogen | 2.24 | 2.66 |
| | Carbon | | |
| | Nitrogen | | |
| | Oxygen | | |
| | Sulphur | .30 | .36 |
| | Ash | | |
| Calorific value determined. | Calories | 3168 | 3759 |
| | British thermal units | 5702 | 6766 |
| #308. | | | |
| Proximate analysis. | Moisture | 15.48 | |
| | Volatile matter | 53.40 | 63.18 |
| | Fixed carbon | 19.47 | 23.04 |
| | Ash | 11.65 | 13.78 |
| | | 100.00 | 100.00 |
| Ultimate analysis. | Hydrogen | 2.73 | 3.23 |
| | Carbon | | |
| | Nitrogen | | |
| | Oxygen | | |
| | Sulphur | .23 | .27 |
| | Ash | | |
| Calorific value determined. | Calories | 3857 | 4564 |
| | British thermal units | 6943 | 8215 |
| #309. | | | |
| Proximate analysis. | Moisture | 16.08 | |
| | Volatile matter | 51.62 | 61.51 |
| | Fixed carbon | 20.02 | 23.86 |
| | Ash | 12.28 | 14.63 |
| Ultimate analysis. | Hydrogen | 2.77 | 3.30 |
| | Carbon | | |
| | Nitrogen | | |
| | Oxygen | | |
| | Sulphur | .23 | .27 |
| | Ash | | |
| Calorific value determined. | Calories | 3868 | 4609 |
| | British thermal units | 6962 | 8296 |

When peats of the foregoing characteristics are subjected to destructive distillation in a closed retort at a temperature of substantially 1200 C. for a period of four to six hours, the distillate gases may be passed in succession through a series of condensers within each of which will be precipitated certain constituents. When these condensers are air cooled at a temperature of substantially 25° C., there will be collected within each condenser an average condensate; a test of such condensate shows the following analyses:

| | Ammonia. | Cresols. |
|---|---|---|
| | Grams. | Grams. |
| Condenser can #1 | 0.0155 | 0.0094 |
| Condenser can #2 | 0.0105 | 0.0097 |
| Condenser can #3 | 0.0196 | 0.0090 |
| Condenser can #4 | 0.0235 | 0.0086 |
| Condenser can #5 | 0.0377 | 0.0070 |

The peat used in the manufacture of the present pyroligneous compound is preferably taken from the surface, and should first be air dried so as to be substantially free from moisture.

The peat originally contains about 80% of water, but when air dried to the consistency desired for the present purposes, the moisture should not exceed 10%, and the entire mass should resemble and feel like a fine black or brown mold. The texture should be a light spongy matter, porous and course, fibrous, or even woody, and should easily fall to pieces to forms that are nearly or entirely devoid of structure, and when wet are as plastic as clay, and when dry form loose, soft masses resembling lignite. This type of peat when dry and untreated is easily crumbled to powder when handled and makes a bulky and unsubstantial fuel that does not bear transportation well. The name "muck" is usually applied to black impure peat of a greater geological age and consists of a more completely decomposed type.

It is found that the surface peat contains substantially 1% more of all ingredients then material taken from twelve feet or more below the surface, which fact shows that peat of younger geological age runs relatively higher in volatile constituents while the peat of older geological age runs higher in the more stable coal tar solids and pyridin.

The peat after preferably being air dried is placed in an iron retort and heated to a temperature of substantially 1200° C. for substantially six hours. The heat process should be so gauged as to convert the resinous materials into volatile hydrocarbons of the aliphatic and aromatic group. The principle of the heating process is to prevent the excessive formation of coke residuum, and to eliminate the otherwise binding materials as useful volatile substances. By properly regulating the temperature and time, it is possible to pass off the resinoids generally used as binders in making coke as desirable volatile ingredients, and little or no cement is formed. These volatile ingredients can either be condensed to produce the desired pyroligneous compound or can be passed off to produce a valuable therapeutic inhalent for respiratory conditions, such as pulmonary tuberculosis, bronchitis, bronchial asthma and empyema. The use of a high temperature such as substantially 1200° C. ensures the distillation of these volatile materials without an opportunity for them to break down with the production of plastic cementing agent, so that they pass off from the retort and may be condensed for the production of the desired pyroligneous compound.

The condensation of the volatile materials shows a large percentage of water, the same being the result of the combination of hydrogen and oxygen from the distilling constituents of the peat.

In order to prevent the formation of cementing materials, it is very desirable to raise the temperature as rapidly as possible to substantially 1200° C. and maintain it uniformly at such temperature. Various forms of retort may be used for this purpose, the same being made either of brick having retorts of copper or silica, or may be made of other materials.

The temperature of substantially 600° C. is a critical temperature for the formation of cementing agents out of the resinoid materials. It is therefore desirable to raise the temperature of the distilling mass rapidly beyond this point so as to conserve the condition of the resinoid materials and eliminate them without the formation of cement, and also for the purpose of bringing them as much as possible into the mass of the pyroligneous material secured in the condensers.

After the destructive distillation is completed at the end of from four to six hours application of heat at substantially 1200° C. there will remain within the retort less then 5% of residuum in the form of a fine granular vegetable charcoal.

Ordinarily, it will be desirable to pass the distillate gases in succession through five separate condensers, and after these condensers are substantially filled their contents may be mixed together, so as to give an average mixture of pyroligneous material. This will contain substantially the following standard analysis:

*Standard analysis of pyroligneous compound.*

| | |
|---|---|
| Specific gravity | 1.016 |
| Total solids, ash | .076 |
| Acetic acid recond | .392 |
| Organic matter recond., as pyridin | .345 |
| Basic amines vol | .514 |
| Phenloids, creosote, etc. | .143 |
| Ethyl alcohol | Trace |
| Methyl alcohol | None |

There will be delivered from the last one of the condensers an uncondensed gas consisting of a mixture of ammonia, nitrogen, hydrogen, oxygen, methane, ethane, ethylen and marsh gas as well as other ingredients of unspecified analysis. This terminal gas will be found to possess desirable curative properties for various pulmonary diseases, such as bronchitis, etc., when inhaled. For this purpose the gas may either be inhaled directly from the terminal condenser or may be stored in suitable containers and shipped to distant points for use in hospitals, sanatoriums, and other institutions.

The character of the plants producing the peat from which the pyroligneous compound is produced is very varied and ranges from the lowest form of plant life from fresh water algæ of the simplest structure, often microscopic in size, and commonly called green pond scums. Not many of the other acquatic groups of a higher order are found except the mosses, liverworts, and a few of the fern allies. Of the aquatic plants found, there are two divisions. The first are truly aquatic and grow habitually under water, sending only their flowers to the surface; the second, all of the vegetative growth, organs, leaves, stems, roots and flowers, reaching the surface or the air above. The water lilies grow in the shallow water and their flowers float on the surface. Plants of the type, including the bullrushes or cattails, some of the water-loving sedges and grasses, pickerel weed, offer the first impediment to the moving waters and extend their growth from shore to a depth of fifteen feet. Shoreward from the depth of five feet, the floating leaves overshow the bottom, intercept the light, permitting thereby a greater growth of species that thrive as the waters recede. This is more particularly the case with the bullrushes, *Scirpus validus*. (Vahl.), and closely related species.

Periods of drought and consequent low water aid the advance of these plants, and the natural chemical evolution aids in developing the peat, locking up thereby for future use and recovery the elements so necessary in this process.

Aquatic vegetation always appears in zones and each zone is characterized by some dominating group of plants. This group in the cattail marshes is principally the Scirpus, Potamogeton, pond weeds, Castalia and Nymphæa, or white and yellow pond lilies, and the amphibious sedges, *Carex eleocharis* and the slender turf forming sedge *Carex filiformis*. All of these plants are wonderful producers in their varying geological stages of the coal tar derivatives and the volatile gases that make for the complete pyroligneous compound, herein disclosed.

Any suitable arrangement of apparatus may be used for practicing the process herein disclosed, but the arrangement shown in the drawing is a convenient one. This includes a cast iron retort 1 located within an oven 2 by means of which it may be heated to the desired temperature. The retort is preferably approximately six inches wide and four feet long as well as four feet high. The gas distilled from the retort is delivered over a pipe 3 to a condenser 4. Other condensers 5, 6, 7 and 8 are placed in series with the condenser 4 by means of pipes 9, 10, 11 and 12. Each of the condensers has a capacity of preferably five gallons or thereabouts.

The gas from the last condenser 8 is delivered through a pipe 13 which leads to a retort or reservoir 14 by means of which the gas may be stored for future use. If desired, arrangement may be made for direct inhalation of gas delivered over the pipe 13 without storage. The apparatus above described may be modified in any suitable manner within the limits defined by the process herein disclosed.

We wish to call attention particularly to the fact that peat bogs of the general characteristics of those found in the vicinity of Morrison, Whiteside County, Illinois, in the Mississippi River Valley, and peat bogs of the general characteristics of those shown on the standard analysis hereinbefore given are peculiarly well adapted for distillation to produce the pyroligeneous compound herein disclosed and which possesses peculiarly desirable curative properties. It is noted particularly that this peat was decomposed from various materials including spongy sedges and bullrushes; that the calorific value of the moisture free peat is substantially 4600 calories; that the volatile matter in the air dried material is substantially 53%; and that the moisture in the air dried peat is substantially 16%. It is also noted that the pyroligneous compound itself shows a specific gravity of substantially 1,016; total ash solids of substantially 7.6%; acetic acid of substantially 39.2%; organic matter recondensed as pyridin substantially 34.5%; and phenloids, creosote, etc., substantially 14.3%. Also it contains a trace of ethyl alcohol.

We claim:

1. As a new article of manufacture, a pyroligneous compound for medical purposes, consisting of the condensate from the destructive distillation of peats of the characteristics herein specified distilled at a temperature of substantially 1200° C. for a period of substantially four hours, said condensate having a specific gravity of substantially 1.016, total ash solids of substantially 7.6%, acetic acid of substantialy 39.2%, organic matter recondensed as pyridin of substantially 34.5%, and phenloids, creosote, etc., of substantially 14.3%, and containing a trace of ethyl alcohol, substantially as described.

2. As a new article of manufacture, a pyroligneous compound for medical purposes, consisting of the condensate from the destructive distillation of peats of the characteristics herein specified distilled at a temperature of substantially 1200° C. for a period of substantially four hours, said condensate having a specific gravity of substantially 1.016, and containing acetic acid, organic matter recondensed as pyridin, and phenloids, creosote, etc., and also containing a trace of ethyl alcohol, substantially as described.

3. The process for the manufacture of a pyroligneous compound for medical purposes, which process consists in the destructive distillation at a temperature of substantially 1200° C. for a period of substantially four hours of peats which when air-dried show a content of volatile matter of substantially 53%, a content of moisture of substantially 16%, and which when moisture free show a calorific value of substantially 4600 calories and the condensation of the volatile products of such distillation, substantially as described.

4. The process for the manufacture of a pyroligneous compound for medical purposes, which consists in first air-drying peats of the general characteristics of those found in the cattail slough near Morrison, Whiteside County, Illinois, until the free moisture does not exceed substantially 10%, so that the peat resembles and feels like a fine black or brown mold, having a texture of a light spongy matter, porous and coarse, fibrous, or even woody, and easily falls to pieces to forms that are nearly or entirely devoid of structure, and which when wet are as plastic as mold, and when dry form loose, soft masses resembling lignite, and which consists in thereafter distilling said air-dried peat in a closed retort at a temperature of substantially 1200° C. for a period of substantially four hours and collecting the distillate gases from such distillation, and which consists in condensing said gases at normal temperature to precipitate the condensates, substantially as described.

5. The process for the manufacture of a pyroligneous compound for medical purposes, which consists in first air-drying peats of the general characteristics of those found in the cattail slough near Morrison, Whiteside County, Illinois, until the free moisture does not exceed substantially 10%, and which consists in thereafter distilling said air-dried peat in a closed retort at a temperature of substantially 1200° C. for a period of substantially four hours and collecting the distillate gases from such distillation, and which consists in condensing said gases at normal temperature to precipitate the condensates, substantialy as described.

LESTER TILTON.
ROBERT G. TIMMS.